United States Patent Office

3,062,789
Patented Nov. 6, 1962

3,062,789
VINYL ALKYL ETHER POLYMERS AND COPOLYMERS
Joginder Lal, Cuyahoga Falls, Ohio, assignor to The Goodyear Tire & Rubber Company, Akron, Ohio, a corporation of Ohio
No Drawing. Filed Jan. 26, 1961, Ser. No. 84,994
8 Claims. (Cl. 260—80.3)

This invention relates to an improvement in the polymerization of vinyl alkyl ethers and copolymers thereof to form tough rubbery polymers of high molecular weight having an ordered structure. More particularly, this invention relates to the polymerization of vinyl alkyl ethers and copolymers thereof to obtain polymers having a crystalline, isotactic structure. Although poly(vinyl alkyl ethers) are known, they have relatively low tensile strength when cured. Therefore, their usefulness is limited to products where low tensile strength is tolerated or permissible.

A principal object of this invention is to provide a method for polymerizing vinyl alkyl ethers to obtain a higher degree of stereoregularity.

Another object of this invention is to provide a method for preparing polymers of vinyl alkyl ethers and copolymers thereof, which possess an isotactic structure. Other objects and advantages of this invention will be apparent from the following discussion and claims.

According to this invention vinyl alkyl ethers and/or comonomers having the structure defined hereinafter are polymerized to solids polymer in the presence of aluminum hexahydrosulfate as a catalyst and a polar solvent. The amount of aluminum hexahydrosulfate required to catalyze the polymerization of the vinyl alkyl ethers and/or comonomers is not critical, provided the amount is sufficient to induce polymerization. The useful range of catalyst is 0.001 to 5% by weight of the monomer. The preferred concentration of the catalyst is 0.005 to 0.5% by weight of the vinyl alkyl ether. The vinyl alkyl ethers may be polymerized with aluminum hexahydrosulfate at temperatures below $-10°$ C. to as high as about $120°$ C. with the preferred range being about $0°$ C. to $50°$ C.

The vinyl alkyl ethers which are polymerized to solid polymers by the improved method of this invention have the general formula $CH_2=CHOR$ where R is an alkyl radical such as methyl, ethyl, propyl, isopropyl, butyl, isobutyl, 2-ethylbutyl, 2-ethylhexyl, or a lauryl radical. It is preferred that alkyl chains have less than about 10 carbon atoms although those of 20 carbons can be used. The preferred vinyl alkyl ethers have the normal alkyl radical rather than a branched one. Preferably, a vinyl alkyl ether monomer of relatively high purity should be used to obtain high molecular weight polymers. Also, mixtures of two or more of the vinyl alkyl ethers may be copolymerized to obtain polymers having properties different from the homopolymers obtained by polymerizing one of the components of the mixture by itself.

In one embodiment of this invention a comonomer can be copolymerized with the vinyl alkyl ether to give a stereoregular copolymer having properties different from the poly(vinyl alkyl ether) polymer. The ratio of vinyl alkyl ether to comonomer can vary over wide limits but the preferred copolymers contain at least 75% vinyl alkyl ether and usually 90% by weight.

Representative examples of the comonomers useful in this invention are found in my copending application having Serial Number 39,802 filed June 30, 1960. In this copending application these comonomers are represented by the following formula $CH_2=CHO(AO)_mCOR$ where A is an alkylene or hydrocarbon substituted alkylene group with a chain of at least 2 carbon atoms between oxygen atoms. A may contain as many as 14 carbon atoms. $m$ is an integer of 1 or higher and R is an acyclically unsaturated hydrocarbon residue of at least two carbon atoms from unsaturated carboxylic acids.

The preferred comonomers are as follows: 2-vinyloxyethyl acrylate, 3-vinyloxypropyl acrylate, 4-vinyloxybutyl acrylate, 2-vinyloxyethoxyethyl acrylate, 2-vinyloxyethyl methacrylate, 3-vinyloxypropyl methacrylate, 4-vinyloxybutyl methacrylate, 2-vinyloxyethoxyethyl methacrylate.

The preferred polar solvent for the vinyl alkyl ethers to obtain a stereoregular polymer or copolymer is carbon disulfide. Normally, the solvent to monomer weight ratio may be from as low as 2 to 1, to as high as 10 to 1 with the preferred ratio range being between about 3 to 1 and 5 to 1. Upon completion of the polymerization of the vinyl alkyl ether in the presence of carbon disulfide and the catalyst, the polymer is obtained as a viscous solution which may be used as such, for from which the polymer may be recovered by evaporation of the polar solvent or by precipitation of the polymer obtained by the addition of a non-solvent to the solution. The poly(vinyl alkyl ether) obtained by this method is a tough, rubbery material having considerable elastic extensibility. X-ray diffraction of the stretched polymer gives a fiber diagram which shows the polymer to posses an isotactic, helical structure having three monomer units in the repeat unit.

More specifically, vinyl-n-butyl ether or vinyl ethyl ether was purified by washing with water, drying over potassium hydroxide and then distilling over sodium wire under nitrogen to obtain a monomer of very high purity. These purified monomers were polymerized at $5°$ C. in the presence of several volumes of carbon disulfide and 0.2% by weight of aluminum hexahydrosulfate to yield polymers which had an X-ray diffraction fiber diagram having identity periods along the stretch axis of 6.60 and 6.67 A. respectively. These values compare remarkably well with the data given by Natta and his coworkers in Makromol Chemie, vols. 18 and 19, p. 455, 1956. In this particular publication, Natta et al. reported the identity periods for an isotactic poly(vinyl isobutyl ether) prepared by using boron trifluoride-etherate as a catalyst, to be 6.7 A. and $6.45\pm0.5$ A. from X-ray and electron diffraction patterns, respectively.

The dilute solution viscosity reported herein was determinated at $25°$ C. on a solution of 0.1 gram of polymer in 100 milliliters of benzene and the results are reported in units of deciliters per gram. The following examples are illustrative of this invention.

EXAMPLE 1

Vinyl ethyl ether was purified by water washing, then drying over potassium hydroxide. The dried vinyl ethyl ether was distilled three times over sodium wire under nitrogen to obtain a vinyl ethyl ether of very high purity. A solution containing 15 grams of vinyl ethyl ether per 100 milliliters of carbon disulfide was made with this purified monomer. This solution was placed in a suitable reaction bottle and 50 mg. of powdered aluminum hexahydrosulfate heptahydrate catalyst was added to the bottle. The screw cap was tightened on the bottle. Then the bottle was placed in a water bath at $5°$ C. and tumbled end over end for 16 hours. The polymer formed was precipitated from the carbon disulfide solution with a methanol-water mixture containing phenyl beta-naphthylamine as a stabilizer and dried to give a quantitative yield of elastomer having an inherent viscosity of 1.9. An X-ray diffraction pattern of this elastomer in the stretched condition gave a well defined fiber diagram. The calculated distance of 6.64 A. between repeating units indicates that the polymer has a helical, isotactic structure.

EXAMPLE 2

Another experiment using the same procedure as in Example 1 was made except that benzene was used as the solvent instead of carbon disulfide. The resulting polymer in the unstretched condition gave an X-ray diffraction pattern which was not as sharply defined as that obtained from the polymer prepared in carbon disulfide as a solvent. Also, the tensile strength on the peroxide-cured poly(vinyl ethyl ether) prepared in carbon disulfide was about 10% higher than on the peroxide-cured poly(vinyl ethyl ether) prepared in benzene.

EXAMPLE 3

Purified and dried vinyl ethyl ether (25 parts) was polymerized with 0.06 part of aluminum hexahydrosulfate heptahydrate catalyst in the presence of 150 parts of dried carbon disulfide. The temperature of polymerization was controlled by tumbling the reaction bottle in a water bath at 5° C. After two hours of polymerization the polymer was precipitated and worked up as in Example 1.

Another batch of the vinyl ethyl ether purified as above was polymerized as above except pentane was used instead of carbon disulfide as the solvent. The solubility of these two polymers was determined in methyl ethyl ketone (MEK). These solubility determinations were made by suspending one gram of each of these polymers in 100 milliliters of methyl ethyl ketone at room temperature (ca. 75° F.) for 48 hours. This suspension was shaken continuously during the 48 hour period and then was filtered through a weighed medium pore sintered glass funnel. The funnel was dried under a high vacuum before and after use. The gain in weight was determined by weighing the funnel before and after use. The gain in weight represented the weight of material present in each of these polymers which was insoluble in methyl ethyl ketone. These data together with the viscosity data are reported as follows:

Table 1

| Solvent Used During Polymerization | Yield | Inherent Viscosity | MEK-Insoluble, Persent |
|---|---|---|---|
| Pentane | Quantitative | 4.68 | 14.7 |
| Carbon Disulfide | do | 4.72 | 25 |

EXAMPLE 4

Vinyl n-butyl ether prepared according to the manner described in Example 1 was polymerized in the same manner as in Example 3, using dried pentane in one case as the solvent and carbon disulfide in the other. In this polymerization high molecular weight elastomers were obtained in quantitative yields with both solvents. These polymers were suspended in methyl ethyl ketone and their insoluble fractions isolated in the same manner as described in Example 3. X-rays diffraction on the insoluble fraction showed the MEK-insoluble fraction isolated from the polymer obtained in carbon disulfide was considerably more crystalline than the corresponding fraction obtained from the polymer prepared in pentane medium.

Similar results are obtained when vinyl octyl ether is used instead of vinyl n-butyl ether.

EXAMPLE 5

The procedure of Example 1 was repeated except a mixture of 96.74 mol percent of vinyl-n-butyl ether and 3.26 mol percent of beta-vinyloxyethyl methacrylate were used. The copolymer obtained using carbon disulfide as the solvent gave an X-ray diffraction pattern which was much sharper than that obtained from the polymer prepared in benzene.

EXAMPLE 6

Two pounds of poly(vinyl n-butyl ether) prepared in pentane solvent and designated as polymer A was mixed with one pound of high abrasion furnace black, sometimes called HAF, in a Banbury at 300° F. for 10 minutes. A similar stock was prepared from polymer B which had been obtained by polymerizing vinyl n-butyl ether in carbon disulfide medium. Aluminum hexahydrosulfate was the catalyst used to prepare both polymers A and B. These two black stocks prepared from polymers A and B were compounded on a conventional roller mill with Di-cup 40C, a 40% dicumyl peroxide sold by Hercules Powder Company, and sulfur. The compounded stocks were cured at 310° F. under pressure and the cured stocks were tested and the data on these cured stocks are shown in Table 1 where all parts are by weight and the values shown are the average of two determinations.

Table 2

|  | I | II | III | IV |
|---|---|---|---|---|
| Polymer A | 100 | 100 | | |
| Polymer B | | | 100 | 100 |
| HAF black | 50 | 50 | 50 | 50 |
| Di-cup 40C | 10 | 10 | 10 | 10 |
| Sulfur | 0.25 | 0.36 | 0.25 | 0.36 |
| Cure 30'/310° F.: | | | | |
| Tensile strength, p.s.i | 1,130 | 1,160 | 1,222 | 1,365 |
| Percent elongation at break | 295 | 247 | 375 | 312 |
| 300% Modulus, p.s.i | | | 1,024 | 1,260 |
| Cure at 45'/310° F.: | | | | |
| Tensile strength, p.s.i | 1,147 | 1,178 | 1,277 | 1,305 |
| Percent elongation at break | 305 | 242 | 342 | 238 |
| 300% Modulus, p.s.i | 1,092 | | 1,000 | 1,145 |

The data from Table 2 discloses that under equivalent conditions of cure improved tensile strength and percent elongation was obtained for the polymer prepared in carbon disulfide relative to the polymer prepared in pentane.

While certain representative embodiments and details have been shown for the purpose of illustrating the invention, it will be apparent to those skilled in this art that various changes and modifications may be made without departing from the spirit or scope of the invention.

What is claimed is:

1. In the polymerization of vinyl alkyl ethers to solid polymers, the improvement which comprises carrying out the polymerization under substantially anhydrous conditions in the presence of a sufficient amount of aluminum hexahydrosulfate to induce polymerization and in the presence of carbon disulfide.

2. A process for converting vinyl alkyl ethers to tough, stereoregular, elastic, polymeric solids which comprises (1) dissolving the vinyl alkyl ether in carbon disulfide, and (2) polymerizing the vinyl ether at temperatures of −10° to 120° C. in the presence of 0.001 to 5% by weight of aluminum hexahydrosulfate.

3. The process of claim 2 wherein the alkyl group is ethyl.

4. The process of claim 2 wherein the alkyl group is propyl.

5. The process of claim 2 wherein the alkyl group is butyl.

6. A process for preparing copolymers of vinyl alkyl ether with comonomers having the following formula:

$$CH_2=CHO(AO)_mCOR$$

where A is an alkylene group having from 2 to 14 carbon atoms, $m$ is an integer having a value of at least 1 and R is a residue derivable from an unsaturated carboxylic acid, which comprises (1) dissolving the vinyl alkyl ether and the comonomer in carbon disulfide, and (2) copolymerizing said vinyl alkyl ether with the comonomer in the presence of 0.001 to 5% by weight of aluminum hexahydrosulfate based on the monomer mixture.

7. In the copolymerization of one vinyl alkyl ether with another vinyl alkyl ether to obtain solid polymers, the improvement which comprises carrying out the copolymerization under substantially anhydrous conditions with the vinyl alkyl ether monomers dissolved in carbon disulfide and in the presence of a sufficient amount of aluminum hexahydrosulfate to induce said copolymerization.

8. In the process of claim 7 wherein the copolymerization occurs at temperatures of —10 to 120° C. and in the presence of 0.001 to 5% by weight of aluminium hexahydrosulfate.

References Cited in the file of this patent
UNITED STATES PATENTS
2,549,921    Mosley _____ Apr. 24, 1951